United States Patent
Sherman et al.

(10) Patent No.: US 6,422,001 B1
(45) Date of Patent: Jul. 23, 2002

(54) REGENERATION CONTROL OF PARTICULATE FILTER, PARTICULARLY IN A HYBRID ELECTRIC VEHICLE

(75) Inventors: James Alan Sherman, Vestal; Arthur Paull Lyons, Maine, both of NY (US)

(73) Assignee: Bae Systems Controls Inc., Johnson City, NY (US)

( * ) Notice: Subject to any disclaimer, the term of this patent is extended or adjusted under 35 U.S.C. 154(b) by 0 days.

(21) Appl. No.: 09/785,723

(22) Filed: Oct. 10, 2000

(51) Int. Cl.$^7$ ................................................ F01N 3/00
(52) U.S. Cl. ............................ 60/274; 60/295; 60/297; 60/311; 180/65.1
(58) Field of Search .................... 60/274, 295, 297, 60/300, 311, 285; 180/65.1, 65.2, 65.3, 65.4

(56) References Cited

U.S. PATENT DOCUMENTS

| | | | |
|---|---|---|---|
| 4,665,690 A | * 5/1987 | Nomoto et al. | 60/286 |
| 4,934,142 A | * 6/1990 | Hayashi et al. | 60/297 |
| 5,050,376 A | * 9/1991 | Stiglic et al. | 60/274 |
| 5,305,602 A | * 4/1994 | Kojima et al. | 60/286 |
| 5,489,319 A | * 2/1996 | Tokuda et al. | 55/213 |
| 5,716,586 A | * 2/1998 | Taniguchi | 422/173 |

* cited by examiner

Primary Examiner—Thomas Denion
Assistant Examiner—Binh Tran
(74) Attorney, Agent, or Firm—Geoffrey H. Krauss; William H. Meise

(57) ABSTRACT

A method for regeneration of particulate filters or traps in the context of a hybrid electric vehicle includes the step of measuring the back pressure of the filter, and adjusting the engine parameters when the back pressure exceeds a particular value to increase the exhaust temperature, to aid in regeneration. In one mode, the engine speed and engine load are both reset toward particular target values. In another version in which the engine load includes an energy storage device such as a battery, increasing the load includes the step of increasing the battery charge level setpoint. Additionally, for those situations in which the battery cannot accept more charge, a power-dissipating resistor is coupled to an electric source to increase the load. In yet another version, the use of the electrical resistor is made dependent upon the temperature of the filter during regeneration.

9 Claims, 4 Drawing Sheets

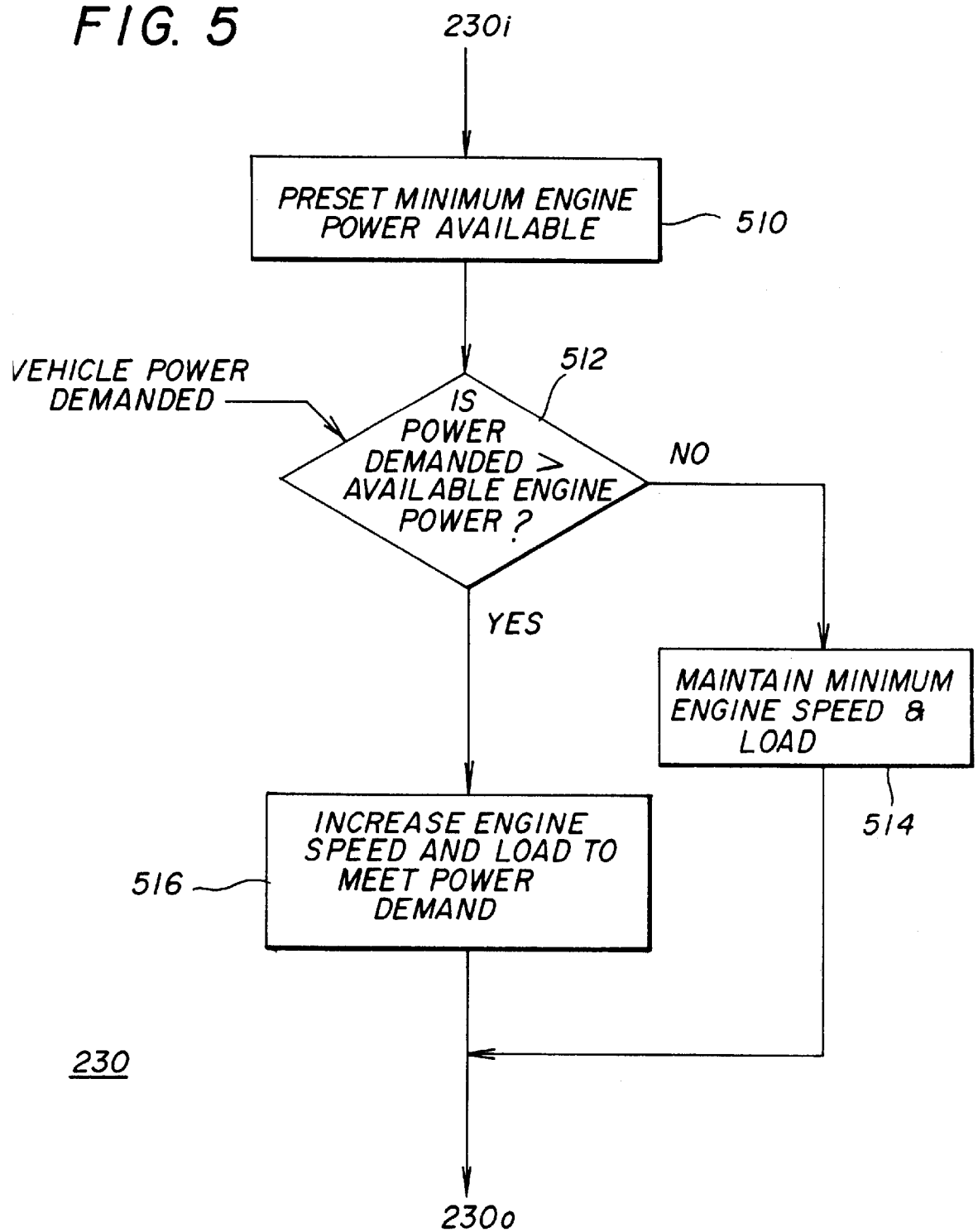

REGENERATION CONTROL OF PARTICULATE FILTER, PARTICULARLY IN A HYBRID ELECTRIC VEHICLE

FIELD OF THE INVENTION

This invention relates to reduction in air pollution, and more particularly to particulate filtration of vehicle exhaust gases.

BACKGROUND OF THE INVENTION

Air cleanliness has become societally important, and government regulations are in force for controlling toxic discharge from factories, industries, and from aircraft and other vehicles. Car exhaust regulations have resulted in improvements in emissions of oxides of nitrogen, hydrocarbons, and carbon monoxide, as well as emissions of so-called greenhouse gases. Truck and bus emissions are subject to regulations which are becoming more stringent. In addition, fuel economy has become more important in recent years, as worldwide demand for petroleum-based liquid hydrocarbon fuels causes increases in fuel prices. Increased fuel economy, in turn, tends to reduce exhaust emissions per mile of travel.

One approach to reduced emissions and improved fuel economy is the use of electrically driven automobiles, trucks and buses. However, electrically driven vehicles tend to have relatively short range, and are difficult to heat and air-condition, and may not be all that economical. Another technique for overcoming some of the problems associated with electrically driven vehicles is the use of hybrid internal-combustion/electrical drive, in which an internal combustion engine drives an electrical generator to produce electricity for recharging batteries, and the vehicle drive is provided by an electrical motor powered at least in part by the batteries. So-called ultracapacitors are expected to approach the performance of electrochemical batteries for electrical storage, and may find use in the future.

An advantage of hybrid electric vehicles is that the internal combustion engine which generates the electrical power is decoupled from the vehicle drive wheels, so the engine may be run at a speed which is independent of the vehicle speed, at least in the short term. This, in turn, allows the engine to be operated at a speed selected for superior fuel economy, reliability, andor emission control.

Improved techniques are desired for reducing the emissions of engines used in vehicle applications.

SUMMARY OF THE INVENTION

A method according to an aspect of the invention is for cleaning a regenerative particulate filter or "trap" associated with a particulate-generating internal combustion engine. The method includes the step of passing exhaust gases from the engine through a regenerative particulate filter for removing particulate matter from the filter effluent or output gases. A back-pressure signal is generated. The back-pressure signal is representative of the average back pressure of the filter. The step of generating a back pressure signal representing the average back pressure-may be performed by generating a series of instantaneous back-pressure signals, and integrating the signals, in known manner, to produce an average. When the back-pressure signal reaches a predetermined threshold, the engine is set to or toward a speed in the lower portion of its range, and the engine loading is increased, whereby the temperature of the engine exhaust gases tends to increase, and the temperature of the filter also tends to increase, thereby aiding in regenerating the filter.

In a particular mode of the method of the invention, the step of increasing the loading comprises the step of adjusting an electrical-energy-producer powered by the engine for generating increased electrical energy, and coupling the increased electrical energy to an electrical load. In a version of this mode, the step of coupling the increased electrical energy includes the step of coupling at least a portion of the increased electrical energy to a resistive dissipating device. An embodiment of a resistive dissipating device is a discrete resistor. In another version of this mode, the step of coupling the increased electrical energy to an electrical load includes the step of coupling at least a portion of the increased electrical energy to a traction energy storage device, such as a battery or ultracapacitor.

In a particularly advantageous mode of the invention, a second threshold is provided, which is at a lower level of back pressure than the first-mentioned threshold. Above this threshold value, the traction energy storage device is charged toward a setpoint which represents a lower energy level, so that energy attributable to the increased load can be stored in the traction storage device without overcharging. In a further embodiment of the invention, the step of controlling the increased loading is accomplished under at least partial control of the filter temperature.

BRIEF DESCRIPTION OF THE DRAWING

FIG. 5 is a simplified flow chart or diagram representing some details of the flow in a portion of the flow chart of FIG. 2 in a slightly different embodiment of the logic.

DESCRIPTION OF THE INVENTION

Figure 1:
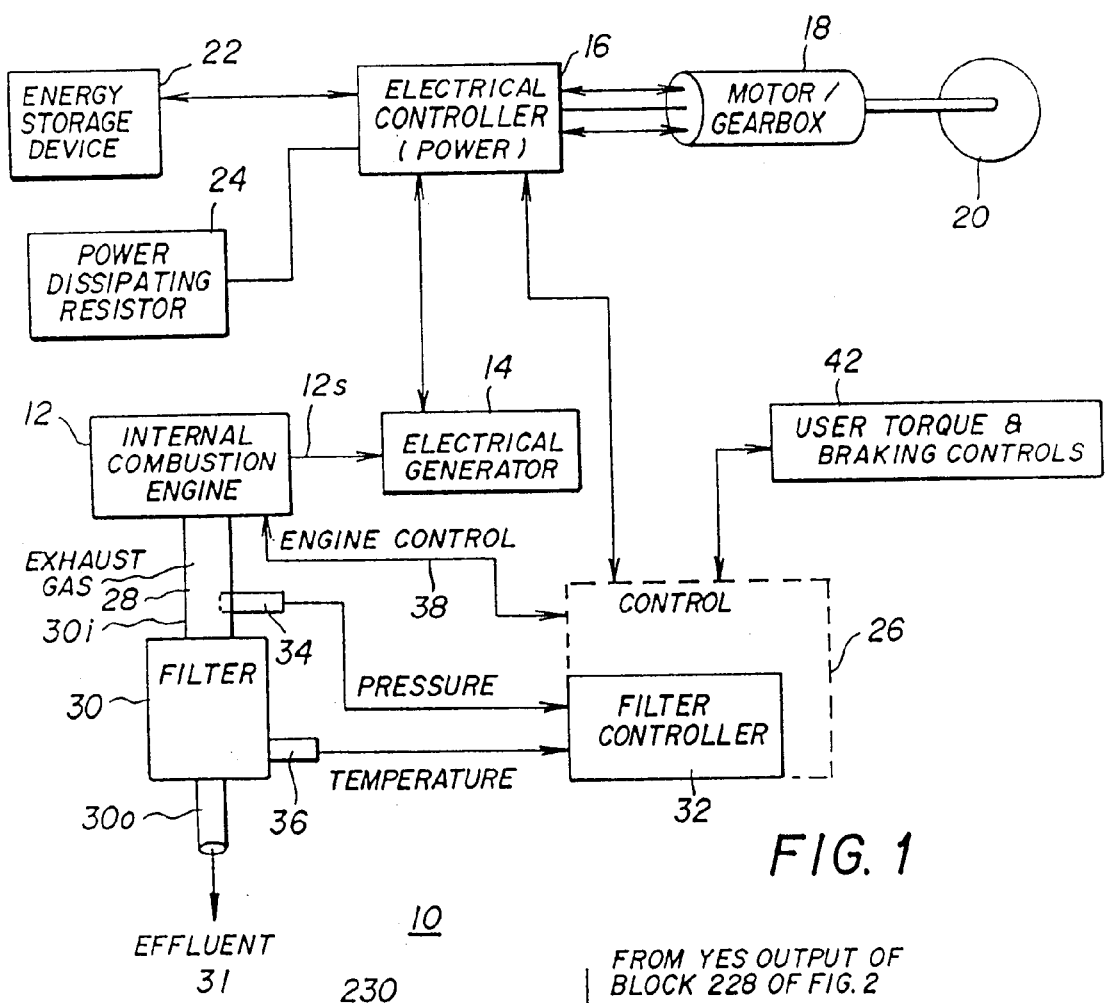
FIG. 1 is a simplified block diagram of a hybrid internal-combustion/electrically driven vehicle according to an aspect of the invention, in which the exhaust gas of the internal combustion engine is filtered or trapped.

In FIG. 1, a vehicle hybrid electrical drive system 10 includes an internal combustion engine 12 which has a rotating output shaft 12s which drives an electrical generator 14. In general, modern generators for hybrid electric purposes are AC (alternating current) generators, but direct-voltage (DC) generators may be used with some minor system changes. Those skilled in the art know that the terms alternating voltage and alternating current are related terms, and that, in general, electrical current cannot exist in the absence of a motive force or voltage. The alternating current or alternating voltage produced by generator 14 is applied to a power-handling electrical controller 16, as known in the art. Power-handling controller 16 includes power switches which are controlled or switched in order to allow power flow in either direct voltage or alternating voltage form among an alternating-current induction motor 18, an alternating-current generator, and a battery or other electrical storage device 22. Motor 18 is mechanically coupled to at least one drive wheel of the vehicle, illustrated as wheel 20. Electrical controller 26 controls the operation of power electrical controller 16 in a field oriented manner, as known in the art, for controlling, among other things, the amount of power applied to or extracted from the motor, for providing driving torque or dynamic braking. Electrical controller 26 also interacts with engine 12 by way of a signal path 38 for monitoring engine operation, and for providing control signals to which the engine is responsive. Electrical controller 26 also interacts with user controls such as a foot-operated torque demand "accelerator" and a foot-operated brake illustrated as a block 42, and may also provide indications of engine and system operation to the operator.

In FIG. 1, the internal combustion engine 12 produces exhaust gases in an exhaust pipe designated as 28. Exhaust pipe 28 guides the exhaust gases to an input port 30*i* of a regenerative particulate filter or trap 30. The filtered exhaust effluent leaves filter 30 by its output port 30*o*. Those skilled in the art know that regenerative particulate filters tend to trap particles entrained within the exhaust gas, so that the filtered effluent is cleaner than the exhaust gas as it leaves the engine. Such filters may be made, for example, from a ceramic honeycomb material which is porous, so that the exhaust gases can pass from input to output, but leave behind at least some of the particulate matter. Deposits of such particulate matter can eventually clog the filter and may result in its destruction. Non-regenerative filters must be cleaned periodically. In the context of a vehicle, however, periodic cleaning may be inconvenient because the vehicle must be taken out of service, and cleaning may also be expensive. Regenerative filters, by contrast, can be cleaned by heating the particulate matter to a temperature at which it combusts or vaporizes. In ordinary use of a vehicle having a regenerative filter, operation at road speeds under moderate to full load generally produces exhaust gases which are at a high enough temperature to raise the filter temperature above the regeneration temperature. Thus, operation at road speed is generally enough to regenerate or clean the particulate filter. Some regenerative filters use electrical heating elements for aiding in heating the filter to a suitable regeneration temperature.

Some classes of vehicle operation, as for example taxis, transit buses, urban delivery vehicles, have operation cycles which include a great deal of idling, and short periods of acceleration, often heavy acceleration. Under these conditions, normal road speeds do not often occur, and the particulate filters do not regenerate as well as in the case of long-distance highway vehicles. Stop-and-go operating regimes, therefore, have a tendency to result in clogging during their normal operation. Such clogging, if allowed to continue, tends to reduce the effective—section of the filter flow path, which in turn tends to increase the temperature in the unclogged portion of the filter. The localized high temperatures in a clogging or clogged filter may result in burn-through of the filter element, which renders it ineffective for its filtering purpose.

According to an aspect of the invention, a pressure sensor is associated with the particulate filter, to provide a signal, preferably an electrical signal, representative of at least the existence of an average back pressure exceeding a particular value. In a preferred embodiment of the arrangement of FIG. 1, the pressure sensor 34 is coupled in pipe 28 near the input port 30*i* of filter 30, to produce an electrical signal representative of or indicative of the back pressure. The electrical signal from sensor 34 representing the back pressure is coupled to a portion 32 of controller 26 which is provided for control of filter regeneration. Portion 32 of controller 26 may, in one version of the invention, also receive signals representing the filter temperature, or the temperature of at least a portion thereof, from a sensor 36.

Figure 2:
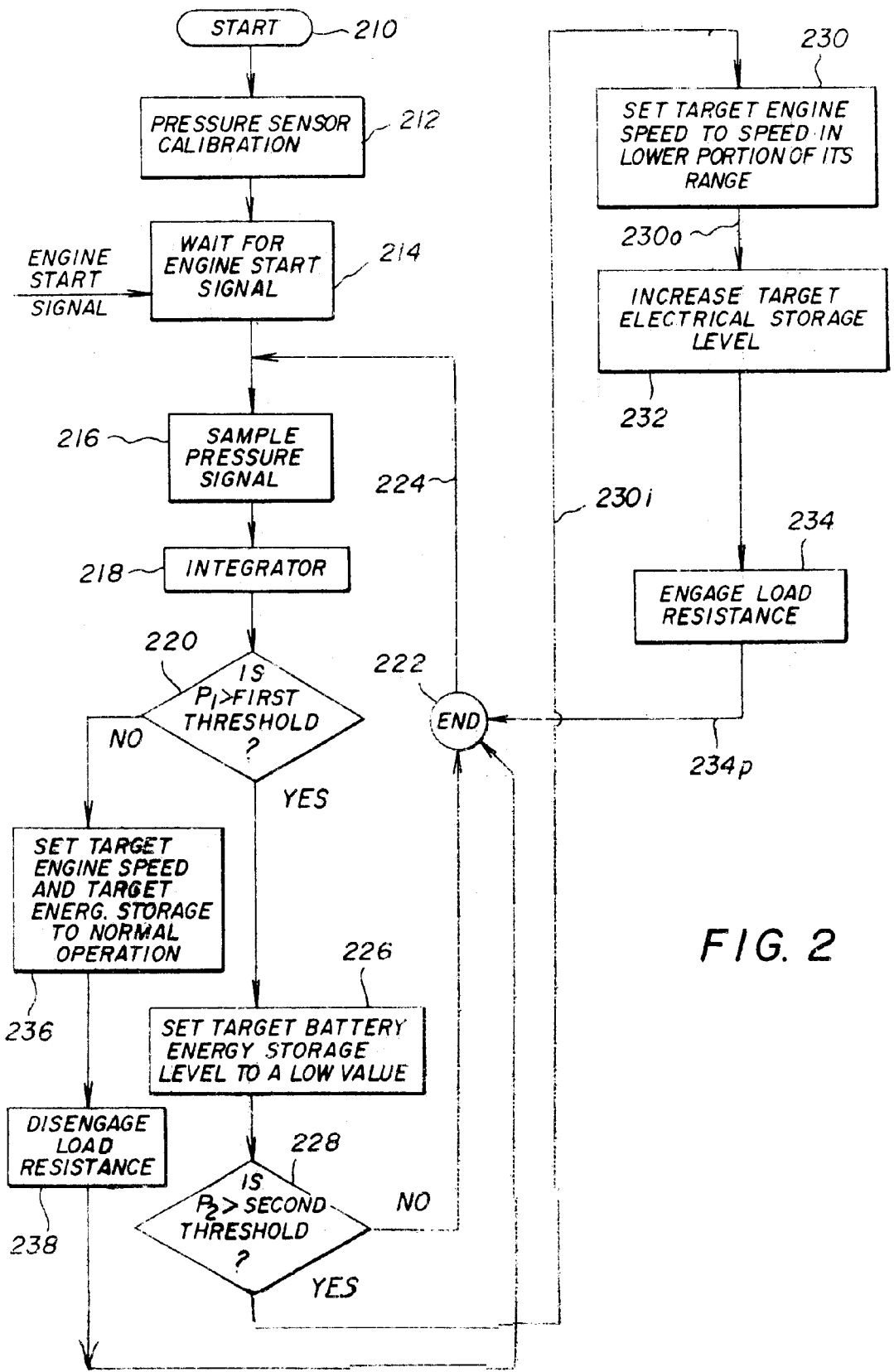
FIG. 2 is a simplified flow chart or diagram describing one form which computer logic can take for accomplishing the ends of the invention.

FIG. 2 is a simplified flow chart or flow diagram illustrating a form that the logic of filter controller 32 of FIG. 1 may take. In FIG. 2, the logic starts at a START block 210, and flows to a block 212, which represents initial calibration of the pressure sensor with the engine stopped. The indicated pressure is taken as the ambient pressure or baseline for all subsequent pressure measurements, and is stored in memory. From block 212, the logic flows to a block 214, which represents a delay or pause until receipt of a signal representing the starting of the engine. When such a signal is received, the logic continues from block 214 to a block 216, which represents sampling of the pressure signal from sensor 34 of FIG. 1. The sampling may be at the clock rate or controlled by a loop, but must produce at least aperiodic samples of the back pressure. The pressure samples controlled by block 216 are applied to an integrator 218, for producing a time average signal. The time average should be sufficiently long to encompass at least several cycles of acceleration and deceleration in the context of a vehicle in an urban-duty driving cycle alluded to above. From integrator 218, the logic flows to a decision block 220, which compares the pressure represented by the pressure signal from sensor 34 of FIG. 1 with a first threshold value $P_1$. This first threshold value $P_1$, is a value somewhat lower than the pressure $P_2$ deemed to represent the pressure at which regeneration will occur or is desired. At back pressure value $P_1$, regeneration is deemed to be imminent. At values of back pressure less than the first threshold $P_1$, the logic leaves decision block 220 by the NO output, and proceeds by way of blocks 236 and 238 to an END block 222. From END block 222, the logic returns by way of a logic path 224 to block 216, to continue the pressure sampling.

Eventually, as operation of the vehicle continues, the back pressure of the filter will reach the first threshold value $P_1$, and the logic leaves decision block 220 of FIG. 2 by the YES output, thereby indicating that regeneration is imminent. From the YES output of decision block 220, the logic flows to a block 226, which represents setting the target value of energy storage in energy storage device 22 of FIG. 1 to a value lower than the value at which it would otherwise be set by the overall controller 26. Suitable arrangements for overall controller 26 are known to those skilled in the art. This resetting of the target energy storage, in turn, tends to reduce the amount of energy in the battery, so that, when regeneration begins, energy can be stored in the battery without overcharging.

From block 226 of FIG. 2, the logic flows to a further decision block 228, which compares the current value of the average back pressure with second threshold value $P_2$, which represents the back pressure at which regeneration is to begin. If the current value of the back pressure is less than the second threshold value $P_2$, the logic leaves decision block 228 by the NO output, and flows to the END block 222. If the current value of the back pressure is equal to or exceeds the limit or threshold value $P_2$, the logic exits decision block 228 by the YES output, and flows by way of a path 230*i* to a block 230. Block 230 represents the resetting of the target value of engine speed controlled by overall controller 26 of FIG. 1, to set the engine in a lower portion of its range. As an example, for a diesel-electric hybrid omnibus intended for urban use, the normal overall control of the engine speed may be dependent upon state of charge of the traction battery, traction demand, and other factors. The signals produced by filter control 32 tend to drive the engine speed toward a speed greater than idle, but less than about half-speed, but still under the control of controller 26. Schemes for resetting control values by summing, multiplication or substitution are well known. From block 230, the logic flows by way of a path 230o to a block 232. Blocks 232 and 234 represent the application of a significant load to the engine. This is accomplished by setting upward the target energy storage level in the battery as suggested by block 232, or by applying electrical energy from the battery 22 and the generator 14 to an electrical power dissipating device such as resistor 24 as suggested by block 234, or possibly both. The logic then flows by way of a logic path 234p to END block 222. The increase of an idle speed to a speed above idle concurrently with the application of the increased load prevents the engine speed from dropping below idle. The decreasing of the engine speed from a higher speed concurrently with the application of an increased load tends to increase the exhaust gas temperature above what it might otherwise be. The increased exhaust temperature, in turn, aids in raising the filter temperature to the regeneration temperature.

It should be noted that the action of block 234 in engaging a load resistance might occur in a scenario in which the traction battery is at less than the current target value, but regenerative braking is taking place so that the current flow charging the battery is at its maximum value. In order to keep the engine exhaust temperature up and continue regeneration, the load must be maintained. Since the load cannot be maintained by charging the batteries, the operation of the resistor 24 as suggested by block 234 allows maintaining the electrical load on the engine/generator combination 12, 14.

When regeneration is complete, the particulate matter in filter 30 of FIG. 1 is burned off, and the back pressure of the filter decreases. When the back pressure on the filter decreases below the second or greater threshold $P_2$, iteration around the loop diverts the logic away from logic blocks 230, 232, and 234 of FIG. 2, but the state of regeneration continues because these three blocks are not reset. Resetting of the conditions established by blocks 230, 232, and 234 occurs only when the back pressure drops below the first or lower reference pressure $P_1$. At that time, the logic iterating around the loop is diverted away from the YES output of decision block 220, and flows instead to the NO output. From the NO output of decision block 220, the logic flows to block 236 for resetting engine speed and battery target charge level to full control by overall controller 26 of FIG. 1, and also traverses block 238 for disengaging load resistance 24. Thereafter, the logic resumes its looping around blocks 216, 218, 220, 236, 238, and 222 and path 224, until the buildup of particulate matter again causes the pre-regeneration and regeneration activity.

Figure 3:
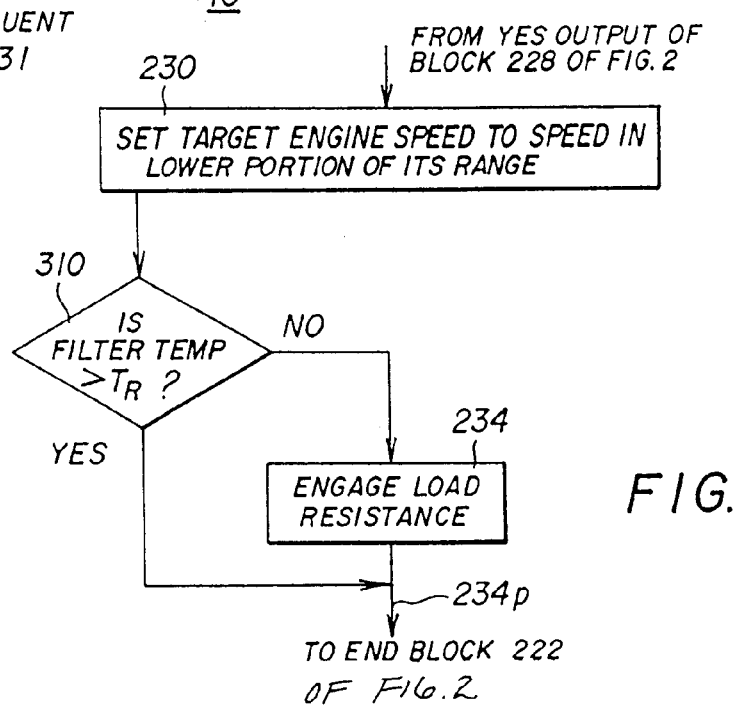
FIG. 3 is a simplified block diagram of a portion of the arrangement of FIG. 2 with the logic flow modified to depend at least partially on the filter temperature.

In FIG. 3, a decision block 310 is interposed in the logic path extending between blocks 230 and 232 of FIG. 2. Decision block 310 compares the filter temperature as measured by sensor 36 of FIG. 1 with a predetermined temperature $T_R$ representing the temperature at which proper filter regeneration is deemed to occur. So long as the filter temperature is above the threshold temperature $t_R$, the logic leaves decision block 310 by the YES output, and bypasses block 234. If the sensed filter temperature is below the temperature which is deemed to be suitable, the load is increased by allowing the logic to flow to block 234, thereby engaging the power-dissipating resistor.

Figure 4:
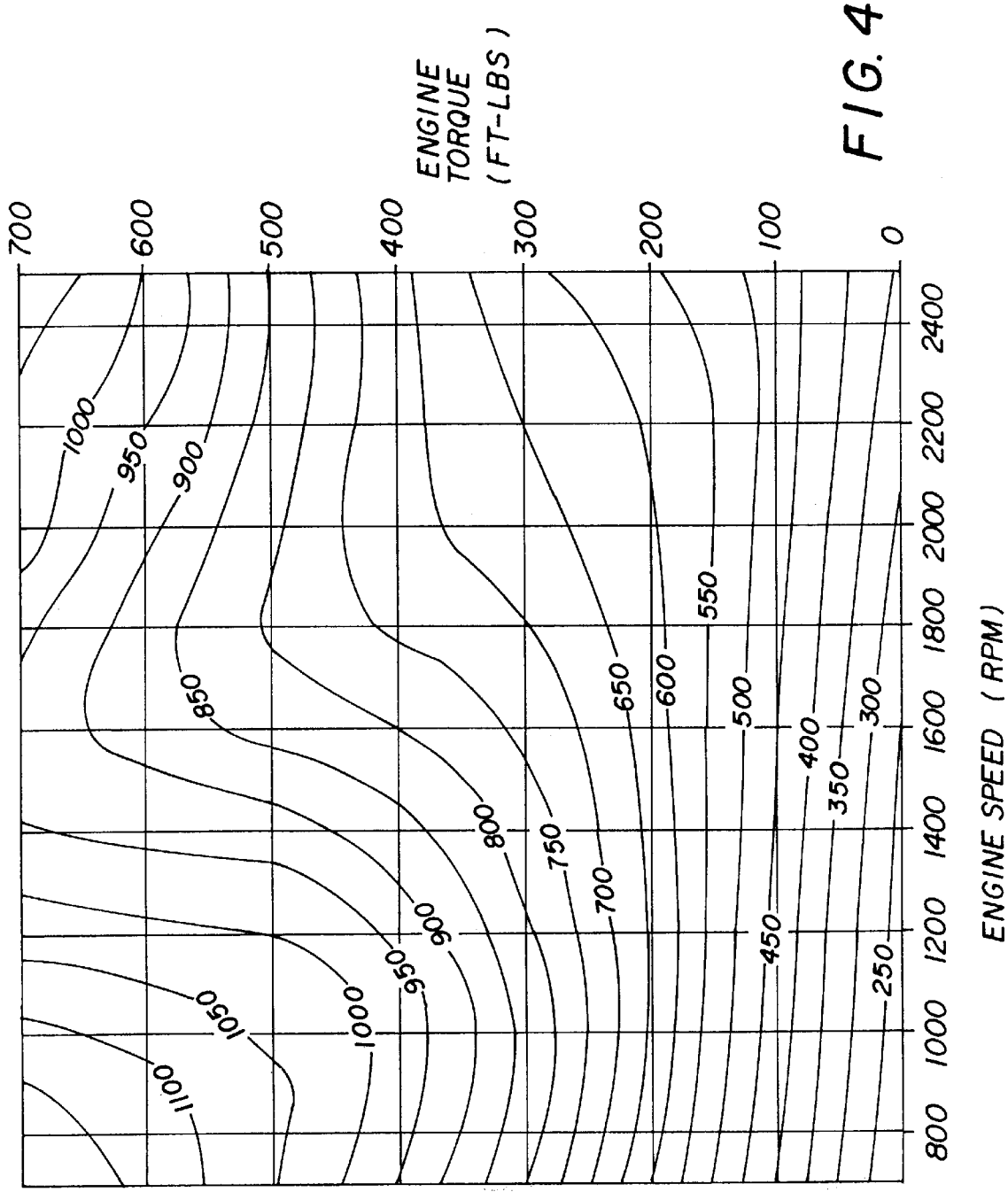
FIG. 4 is a plot of engine torque versus engine speed for a Cummins diesel engine, with exhaust temperature as a parameter.

FIG. 4 is a plot of engine torque versus engine speed for a Cummins diesel engine, with exhaust temperature as a parameter. In FIG. 4, each isotherm is designated by its temperature in EF. A plot generally similar to that of FIG. 4 can be generated for each different type andor manufacturer of diesel engine. A digitized or quantized representation of a plot similar to that of FIG. 4 is loaded into a ROM or equivalent memory associated with filter controller 32 of FIG. 1, and is available to the controller.

FIG. 5 is a simplified flow chart or diagram illustrating some details of the logic flow in block 230 of FIG. 2 in a slightly different operating mode. The logic flow illustrated in FIG. 5 not only controls the engine speed and load, but in addition controls the engine load in dependence on the engine speed and the vehicle load in order to maintain the engine exhaust at or above a threshold temperature. The logic of FIG. 5 assumes that the overall controller 26 of FIG. 1 "knows" at least the actual power entering the traction motor 18, the minimum regeneration temperature required for the filter being used, whether the vehicle is moving or not. In FIG. 5, the logic flow arrives at a block 510 by way of path 230i. Block 510 represents the setting of a default value of engine speed, which exceeds the idling speed. Referring to the plot of FIG. 4, block 510 represents the selection of 1000 RPM, for example, to be the default engine speed when the vehicle is not moving, to prevent stalling when a load is applied. This default engine speed exceeds the idling speed, which might be 800 RPM. From block 510, the logic proceeds to a decision block 512, which examines the vehicle power demand, which can be determined either from the motor torque demand signal produced by user control 42 of FIG. 1, or by actual measurement of the electrical energy entering motor 18. Block 512 compares the vehicle power demand with the available engine power. The available engine power is the product of the engine speed and the engine torque. Engine speed is known to the controller, and the engine torque can be determined from the power leaving the generator 14 of FIG. 1. The overall controller 26 maintains a setpoint for the battery charge, and adjusts the battery demand to maintain the desired charge. The battery power demand plus the motor power demand are provided by the generator under control of the overall controller, so there will be some finite value of generator output at any given generator speed, so the filter controller logic of FIG. 5 will find some finite value of generator demand and therefore of engine load. If the vehicle demand is less than the available power, the logic leaves decision block 512 by the NO output, and proceeds to a block 514. Block 514 represents the maintaining of the default engine speed and the current load. On the other hand, if decision block 512 finds that the vehicle power demand exceeds the available power, the logic leaves by the YES output, and arrives at a block 516. Block 516 represents increasing the engine speed, and therefore the engine power, to meet the power demand and maintain the exhaust temperature, using the FIG. 4 information preloaded into the filter controller to move along an isotherm. Preferably, the isotherm along which the engine travels is the one representing the minimum regeneration temperature $T_R$, because an engine exhaust temperature exceeding the desired regeneration temperature represents wasted energy. The regeneration temperature $T_R$ is established by the filter manufacturer, but in general is in the vicinity of 400EC, corresponding to about 750EF.

Other embodiments of the invention will be apparent to those skilled in the art. For example, if the vehicle were a cog railway, the drive wheel would be a spur gear rather than a drive wheel. While a diesel engine has been described, any internal combustion engine may be used. While the temperature of the filter has been described as being used merely for preventing turn-off of the increased engine loading until the regeneration has reached a particular temperature, those skilled in the art will recognize that the temperature may also be used to control the increased-loading setpoint, so that too low a temperature during regeneration results in an increased exhaust temperature.

Thus, in general, a method for regeneration of particulate filters or traps in the context of a hybrid electric vehicle includes the step of measuring the back pressure of the filter, and adjusting the engine parameters when the back pressure exceeds a particular value to increase the exhaust temperature, to aid in regeneration. In one mode, the engine speed and engine load are both reset toward particular target values. In another version in which the engine load includes an energy storage device such as a battery, increasing the load includes the step of increasing the battery charge level setpoint. Additionally, for those situations in which the battery cannot accept more charge, a power-dissipating resistor is coupled to an electric source to increase the load. In yet another version, the use of the electrical resistor is made dependent upon the temperature of the filter during regeneration.

More particularly, a method according to an aspect of the invention is for cleaning a regenerative particulate filter or trap (36) associated with a particulate-generating internal combustion engine (12). The method includes the step of passing exhaust gases from the engine (12) through a regenerative particulate filter (36) for removing particulate matter from the filter (36) effluent (31) or output gases. A filter back-pressure signal is generated (34). The back-pressure signal is representative of the average back pressure of the filter (36). The step of generating a back pressure signal representing the average back pressure may be performed by generating a series of instantaneous back-pressure signals (216), and integrating (218) the signals, in known manner, to produce an average. When the average back-pressure signal reaches a predetermined threshold ($p_2$), the engine (12) is set to or toward a speed in the lower portion of its range, but above idle, and the engine (12) loading is increased (230, 232, 234), whereby the temperature of the engine (12) exhaust gases (31) tends to increase, and the temperature of the filter (36) also tends to increase, thereby aiding in regenerating the filter (36).

In a particular mode of the method of the invention, the step (230, 232, 234) of increasing the loading comprises the step of adjusting an electrical-energy-producer (14, 26) powered by the engine (12) for generating increased electrical energy, and coupling the increased electrical energy to an electrical load (232, 234). In a version of this mode, the step of coupling the increased electrical energy (232, 234) includes the step of coupling at least a portion of the increased electrical energy to a resistive dissipating device (234). An embodiment of a resistive dissipating device is a discrete resistor. In another version of this mode, the step (232, 234) of coupling the increased electrical energy to an electrical load includes the step (232) of coupling at least a portion of the increased electrical energy to a traction energy storage device, such as a battery or ultracapacitor.

In a particularly advantageous mode of the invention, a second threshold ($P_1$) is provided, which is at a lower level of back pressure than the first-mentioned threshold ($P_2$). Above this second threshold value ($P_1$), the traction energy storage device (22) is charged toward a setpoint which represents a lower energy level than it would otherwise tend toward, so that energy attributable to the increased load can later be stored in the traction storage device without overcharging. In a further embodiment of the invention, the step of controlling the increased loading is accomplished under at least partial control of the filter (36) temperature.

What is claimed is:

1. A method for cleaning a regenerative particulate filter associated with a particulate-generating internal combustion engine, the steps comprising:
   a) providing an internal combustion engine having a range of selectable operating speeds and producing exhaust gas comprising particulate matter, said exhaust gas being temperature dependent, at least in part, upon a selected operating speed of said internal combustion engine;
   b) providing an electrical generator operatively connected to and powered by said internal combustion engine;
   c) passing said exhaust gas from said internal combustion engine through a regenerative particulate filter for removing and capturing therein at least a portion of said particulate matter from said exhaust gas, said particulate filter having a back pressure dependent at least in part upon a quantity of said particulate matter captured therein;
   d) generating a first back pressure signal representative of a first, predetermined back pressure of said particulate filter;
   e) upon receipt of said first back pressure signal, setting said operating speed of said internal combustion engine to a speed selected from the low end of said range of selectable operating speeds; and
   f) controlling a load applied to said internal combustion engine substantially simultaneously with said setting step (e);
   whereby said temperature of said exhaust gas is increased and a temperature of said particulate filter is also increased in response thereto, thereby facilitating the cleaning thereof.

2. The method for cleaning a regenerative particulate filter associated with a particulate-generating, internal combustion engine, as recited in claim 1, wherein said controlling a load step (f) further comprises the sub-steps:
   i) coupling the output of said generator to an electrical load; and
   ii) adjusting said electrical load until a desired loading is applied to said internal combustion engine.

3. The method for cleaning a regenerative particulate filter associated-with a particulate-generating internal combustion engine, as recited in claim 2, herein said electrical load comprises a resistive dissipating device.

4. The method for cleaning a regenerative particulate filter associated with a particulate-generating internal combustion engine, as recited in claim 3, wherein said resistive dissipating device comprises a load resistor.

5. The method for cleaning a regenerative particulate filter associated with a particulate-generating internal combustion engine, as recited in claim 2, wherein said electrical load comprises an energy storage device.

6. The method for cleaning a regenerative particulate filter associated with a particulate-generating internal combustion engine, as recited in claim 5, wherein said energy storage device comprises at least one from the group: battery and ultracapacitor.

7. The method for cleaning a regenerative particulate filter associated with a particulate-generating internal combustion engine, as recited in claim 5, the steps further comprising:
   a) generating a second back pressure signal representative of a second, predetermined back pressure of said regenerative particulate filter, said second predetermined back pressure being lower than said first, predetermined back pressure; and
   b) modifying a set point associated with said energy storage device so that said increased energy output may later be accommodated by said energy storage device while minimizing overcharging thereof.

8. The method for cleaning a regenerative particulate filter associated with a particulate-generating internal combustion engine, as recited in claim 1, wherein said controlling a load step (f) is responsive to a temperature of at least a portion of said regenerative particulate filter.

9. The method for cleaning a regenerative particulate filter associated with a particulate-generating internal combustion engine, as recited in claim 1, wherein said internal combustion engine is adapted to propel a vehicle having a traction demand, and wherein said controlling a load step (f) is responsive to said traction demand so as to operate said internal combustion engine near a torque-speed temperature isotherm.

* * * * *